(12) United States Patent
Li et al.

(10) Patent No.: US 12,313,130 B2
(45) Date of Patent: May 27, 2025

(54) ONE-WAY DAMPING STRUCTURE AND ADJUSTING ASSEMBLY COMPRISING ONE-WAY DAMPING STRUCTURE

(71) Applicant: KEIPER SEATING MECHANISMS CO., LTD., Shanghai (CN)

(72) Inventors: Qichao Li, Shanghai (CN); Peijing Sun, Shanghai (CN); Jian Chang, Shanghai (CN)

(73) Assignee: KEIPER SEATING MECHANISMS CO., LTD. (CN)

( * ) Notice: Subject to any disclaimer, the term of this patent is extended or adjusted under 35 U.S.C. 154(b) by 533 days.

(21) Appl. No.: 17/771,724

(22) PCT Filed: Jul. 22, 2020

(86) PCT No.: PCT/CN2020/103516
§ 371 (c)(1),
(2) Date: Nov. 28, 2022

(87) PCT Pub. No.: WO2021/082541
PCT Pub. Date: May 6, 2021

(65) Prior Publication Data
US 2023/0137377 A1     May 4, 2023

(30) Foreign Application Priority Data

Oct. 31, 2019    (CN) .......................... 201911054667.9
Oct. 31, 2019    (CN) .......................... 201921860583.X

(51) Int. Cl.
*F16D 41/20*          (2006.01)
*B60N 2/16*          (2006.01)
(Continued)

(52) U.S. Cl.
CPC ........... *F16D 41/206* (2013.01); *B60N 2/166* (2013.01); *F16D 43/211* (2013.01); *F16F 15/10* (2013.01); *F16H 19/08* (2013.01)

(58) Field of Classification Search
CPC ........ B60N 2/166; B60N 2/168; B60N 2/165; B60N 2/02253; F16D 41/206; F16D 43/211; F16F 15/10; F16H 19/08
See application file for complete search history.

(56) References Cited

U.S. PATENT DOCUMENTS

2003/0200830 A1*   10/2003   Schauder ................ F16H 55/14
                                                                                                                   74/439

FOREIGN PATENT DOCUMENTS

CN         1708653 A      12/2005
CN         1958332 A       5/2007
(Continued)

OTHER PUBLICATIONS

International Search Report and Written Opinion with English Translation for PCT Application No. PCT/CN2020/103516, dated Oct. 29, 2020, 12 pages.

*Primary Examiner* — Lori Wu
(74) *Attorney, Agent, or Firm* — Dickinson Wright PLLC

(57) ABSTRACT

Disclosed is a one-way damping structure, comprising a spring, a drive element and a friction force generation member, the spring and the drive element being connected such that the spring is driven by means of the drive element; the spring comprises a fixing portion, a connecting portion and an annular portion, the connecting portion being located between the fixing portion and the annular portion and connecting the fixing portion to the annular portion, and the fixing portion being fixed; and the annular portion comprises at least half a turn for defining a spring opening which spirally extends in the circumferential direction, and slides relative to the friction force generation member so as to
(Continued)

generate friction torque. Also disclosed is an adjusting assembly and a seat height adjuster utilizing one-way damping properties in which the spring of the one-way damping structure generates different torques in different rotation directions.

18 Claims, 20 Drawing Sheets

(51) Int. Cl.
  *F16D 43/21* (2006.01)
  *F16F 15/10* (2006.01)
  *F16H 19/08* (2006.01)

(56) References Cited

FOREIGN PATENT DOCUMENTS

| | | | |
|---|---|---|---|
| CN | 102808872 A | | 12/2014 |
| CN | 108443463 A | | 8/2018 |
| CN | 110645318 A | | 1/2020 |
| CN | 210686842 U | | 6/2020 |
| EP | 0505090 A1 | | 9/1992 |
| JP | 58209630 A | * | 12/1983 |
| JP | S6082746 U | * | 6/1985 |

* cited by examiner

ONE-WAY DAMPING STRUCTURE AND ADJUSTING ASSEMBLY COMPRISING ONE-WAY DAMPING STRUCTURE

CROSS-REFERENCE TO RELATED APPLICATIONS

This application is a 371 of international PCT/CN2020/103516, filed on Jul. 22, 2020, which claims priority to CN201911054667.9 and CN201921860583.X, filed on Oct. 31, 2019, and the contents of which are hereby incorporated by reference.

BACKGROUND OF THE INVENTION

1. Field of the Invention

The present invention relates to a vehicle seat, and more particularly to a one-way damping structure and an adjusting assembly comprising the one-way damping structure.

2. Related Art

In the prior art, for a seat with an electric height adjustment, a structure of a first-stage worm helical gear and a second-stage small tooth difference transmission is generally used to transmit motion and power of a motor to an output end, such that the seat is adjusted upwards and downward by a height adjustment mechanism for a seat basin. When the seat is adjusted upwards, with gravity of a load acting downward, the electric upward adjustment runs by defying the load all the time, wherein the helical gear is rotated driven by the motor in virtue of the worm all the time, and the second-stage small tooth difference is subsequently driven, such that the output gear is driven to lift the seat, and wherein the same tooth surface of the worm keeps meshing with the same tooth surface of the helical gear during the process. When the seat is adjusted downwards, with gravity of a load acting downward, there will be two situations. In one case, the helical gear is rotated driven by the motor in virtue of the worm, and the second-stage small tooth difference is subsequently driven, such that the output gear is driven to lower the seat. In the other case, the output gear is rotated driven by the load, the second-stage small tooth difference is subsequently driven, and the helical gear is subsequently driven, such that the worm is back-driven by the helical gear. Above two situations occur alternately when the internal resistance of the system is unstable, thus the meshing tooth surfaces of the worm and the helical gear are switched with each other, which in turn causes the instability of the second-stage small tooth difference transmission. The problems such as abnormal noise and unstable operation, etc are brought out in the downward adjustment.

In order to solve the problem of unstable operation when the seat is adjusted downwards, a circumferential spring and a wedge block structure are known to be incorporated into the product to increase the internal resistance of the system with gravity of the load acting downward. However, such increased internal resistance will decrease the lifting ability of the product during the upward adjustment, and the control of the internal resistance of the system will become more difficult.

SUMMARY OF THE INVENTION

In order to solve the problem of unstable operation when the seat is adjusted downwards in the prior art, the present invention provides a one-way damping structure and an adjustment assembly including the one-way damping structure.

The one-way damping structure according to the present invention comprises a spring, a drive element and a friction force generation member, wherein the spring and the drive element are connected such that the spring is driven by means of the drive element, wherein the spring comprises a fixing portion, a connecting portion and an annular portion, wherein the connecting portion is located between the fixing portion and the annular portion and connects the fixing portion to the annular portion, wherein the fixing portion is fixed, wherein the annular portion comprises at least half a turn spirally extending in a circumferential direction and defining a spring opening, and wherein the annular portion slides relative to the friction force generation member so as to generate a friction torque.

In preferred embodiments, the one-way damping structure comprises an installation shaft, which is formed as the friction force generation member, wherein the annular portion is around on the installation shaft in an interference fit manner such that the friction torque is generated by the slide of an internal wall defining the opening of the annular portion relative to an outer surface of the installation shaft. That is to say, the friction force generation member is the installation shaft as a friction shaft.

Preferably, a fixing hole or fixing groove is disposed on an end face of the drive element adjacent to the spring, wherein the fixing portion of the spring is received in the fixing hole or fixing groove.

In preferred embodiments, the one-way damping structure further comprises an annular bushing, an internal wall defining an opening of which is formed as the friction force generation member, wherein the friction torque is generated by the slide of an outer diameter surface of the annular portion relative to the internal wall defining the opening of the annular bushing. That is to say, the friction force generation member is the internal wall defining the opening of the annular bushing as an internal wall defining a friction hole.

Preferably, the outer diameter surface of the annular portion and the internal wall defining the opening of the annular bushing are in an interference fit manner.

In preferred embodiments, the one-way damping structure further comprises a protruding structure independent of the drive element, wherein the fixing portion is fixed to the protruding structure, wherein the drive element comprises a protruding annulus, which is formed as the friction force generation member, and wherein the annular portion is around on the annulus and the friction torque is generated by the slide of the annular portion relative to the annulus. That is to say, the friction force generation member is the annulus as a friction shaft.

Preferably, the protruding structure comprises at least one protuberance, wherein the fixing portion is fixed by a space groove enclosed by the protuberance.

Preferably, a receiving groove is defined by the annulus and a peripheral edge of the drive element, wherein the annular portion is received in the receiving groove and is around on the annulus in an interference fit manner.

In preferred embodiments, the one-way damping structure further comprises a bearing structure independent of the drive element, which is formed as the friction force generation member, wherein the annular portion is around on the bearing structure in an interference fit manner such that the friction torque is generated by the slide of the annular portion relative to the bearing structure. That is to say, the friction force generation member is the bearing structure as a friction shaft.

Preferably, the one-way damping structure comprises an installation shaft, wherein the drive element is around on the installation shaft, and wherein a surface of the bearing structure facing the drive element is matched with a surface of the drive element facing the bearing structure so as to support the installation shaft.

In preferred embodiments, the one-way damping structure further comprises a bushing structure connected to the drive element in an anti-torsion manner, wherein the fixing portion is clamped by the bushing structure, wherein the annular portion is tightly installed in a fixing groove, an inner cylindrical surface of which is formed as the friction force generation member, and wherein the friction torque is generated by the slide of an outer diameter surface of the annular portion relative to the inner cylindrical surface of the fixing groove. That is to say, the friction force generation member is the inner cylindrical surface of the fixed groove as an internal wall defining a friction hole.

Preferably, the bushing structure comprises a clamping structure and pins oppositely protruding from a body, wherein the bushing structure is connected to the drive element in virtue of the pins, and wherein the fixing portion is clamped in virtue of the clamping structure.

Preferably, the clamping structure comprises a fixing bump for clamping the fixing portion.

The adjustment assembly according to the present invention comprises the above-mentioned one-way damping structure.

Preferably, the adjustment assembly further comprises an output structure, an installation structure and a driver, wherein the one-way damping structure and the output structure are installed on the installation structure, and wherein the driver is connected to the output structure by the one-way damping structure.

Preferably, the output structure is connected to a height adjustment mechanism for a seat basin, wherein the adjustment assembly forms a seat height adjuster.

Preferably, the installation structure comprises a gearbox fixedly connected to a cover plate, wherein the one-way damping structure and the output structure are installed between the gearbox and the cover plate.

Preferably, the adjustment assembly further comprises a gasket disposed between the spring and the gearbox.

Preferably, the adjusting assembly further comprises an installation structure and a driver, wherein the one-way damping structure is installed on the installation structure, wherein the driver has a motor shaft, wherein the annular portion of the spring is around on the motor shaft in an interference fit manner such that the friction torque is generated by the slide of an internal wall defining the opening of the annular portion relative to the outer surface of the motor shaft.

Preferably, the installation structure comprises a gearbox fixedly connected to a cover plate, wherein the one-way damping structure is installed between the gearbox and the cover plate, wherein the gearbox has a fixing groove, and wherein the fixing portion of the spring is fixed to the fixing groove.

The seat height adjuster according to the present invention utilizes one-way damping properties in which the spring of the one-way damping structure generates different torques in different rotation directions. In combination with the traditional output structure and installation structure, the driver continues to stably defy a fixed load so as to work when the seat is adjusted downwards under the load, and the lifting ability is unaffected when the seat is adjusted upwards.

DESCRIPTION OF THE ENABLING EMBODIMENT

In conjunction with the accompanying drawings, preferred embodiments of the present invention are given and described in detail below.

Figure 1:
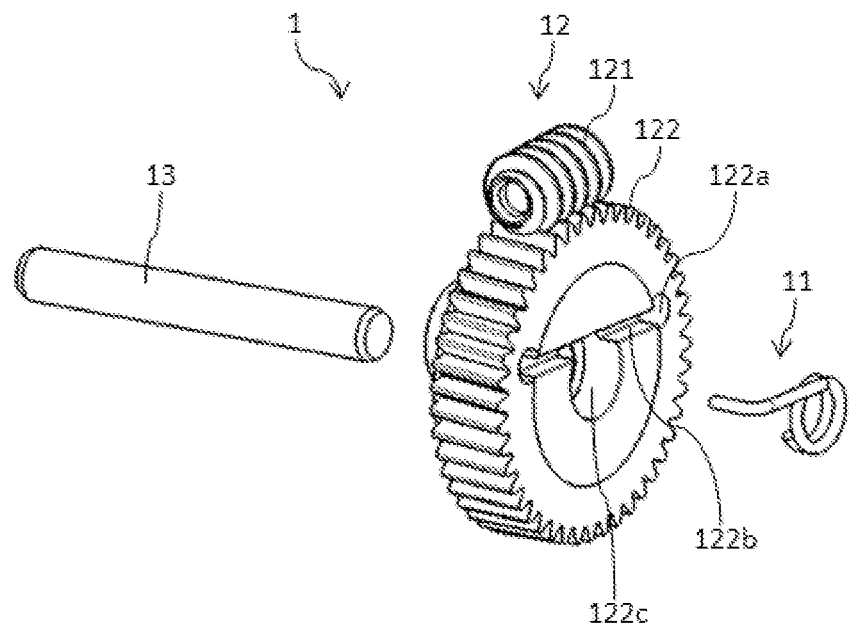
FIG. 1 is an exploded view of a one-way damping structure according to a first preferred embodiment of the present invention.
Figure 2:
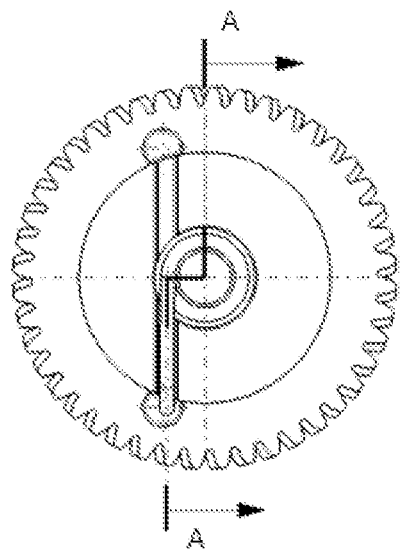
FIG. 2 is a side view of the one-way damping structure of FIG. 1.
Figure 3:
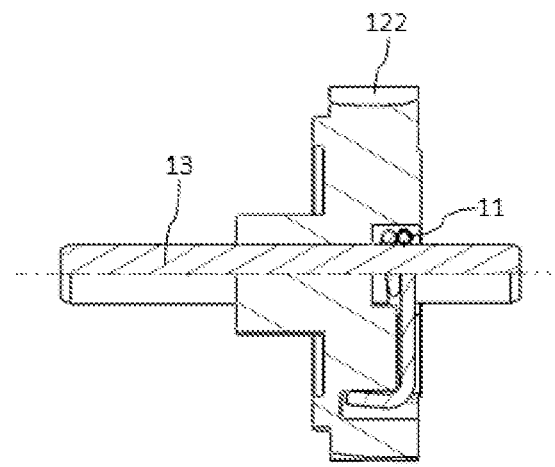
FIG. 3 is a cross-sectional view taken along line A-A of FIG. 2.

As shown in FIG. 1, a one-way damping structure 1 according to a first preferred embodiment of the present invention comprises a spring 11, a drive element 12 and an installation shaft 13, wherein the spring 11 and the drive element 12 are around on the installation shaft 13. Specifically, the drive element 12 comprises a worm gear 121 meshed with a helical gear 122, wherein the spring 11 and the helical gear 122 are around on the installation shaft 13, as shown in FIGS. 2-3.

Figure 4:
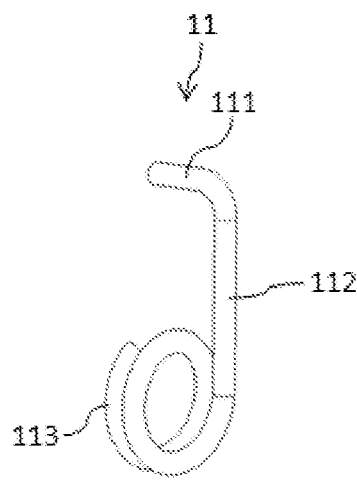
FIG. 4 is a structural schematic diagram of the spring of FIG. 1.

As shown in FIG. 4, the spring 11 comprises a fixing portion 111, a connecting portion 112 and an annular portion 113, wherein the connecting portion 112 is located between the fixing portion 111 and the annular portion 113 and connects the fixing portion 111 to the annular portion 113. In particular, the annular portion 113 comprises at least half a turn spirally extending in a circumferential direction and defining a spring opening.

Returning to FIG. 1, the helical gear 122 comprises a fixing hole 122a, a connecting groove 122b and a receiving hole 122c disposed on the end face adjacent to the spring 11. With reference to FIGS. 2-3, the fixing portion 111, the connecting portion 112 and the annular portion 113 of the spring 11 are respectively received in the fixing hole 122a, the connecting groove 122b and the receiving hole 122c of the helical gear 122.

In particular, the annular portion 113 of the spring 11 is around on the installation shaft 13 in an interference fit manner. As such, one end of the spring 11 is fixed to the helical gear 122, and the other end is around on the installation shaft 13 in the interference fit manner. When the helical gear 122 is rotated around an axis L of the installation shaft 13 under an external force, the fixing portion 111 of the spring 11 is rotated accordingly, and the annular portion 113 of the spring 11 slides relative to the installation shaft 13 to generate friction torque. It should be understood that the installation shaft 13 may be fixed or rotated around the axis L. As long as the rotation of the installation shaft 13 is asynchronous with the rotation of the helical gear 122 to produce a relative slide, the friction torque is generated.

Figure 5:
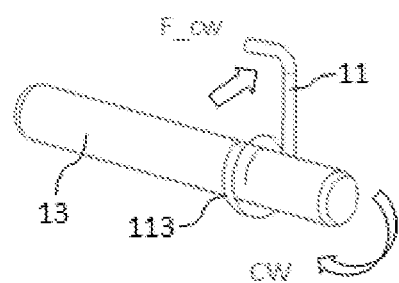
FIG. 5 is a first mating state diagram of the installation shaft and the spring of FIG. 1.
Figure 6:
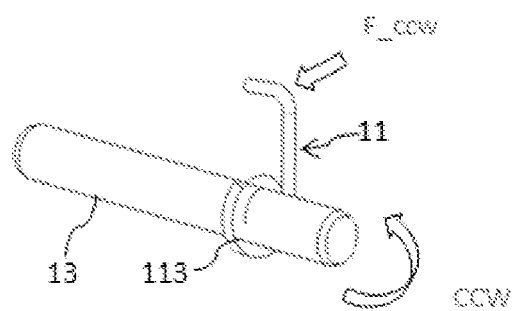
FIG. 6 is a second mating state diagram of the installation shaft and the spring of FIG. 1.

According to the characteristics of the spring structure, the spring becomes tighter when rotated in a helical direction, and the spring becomes looser when rotated in a reverse helical direction. As shown in FIG. 5, when the force of F_cw in the reverse helical direction is applied to the spring 11 by the helical gear 122, the annular portion 113 of the spring 11 is rotated in the CW direction relative to the installation shaft 13, and a relatively small friction torque is generated by the slide of the spring 11 relative to the installation shaft 13. As shown in FIG. 6, when the force of F_ccw in the helical direction is applied to the spring 11 by the helical gear 122, the annular portion 113 of the spring 11 is rotated in the CCW direction relative to the installation shaft 13, and a rated friction torque is generated by the slide of the spring 11 relative to the installation shaft 13. The rated friction torque can be designed and controlled as needed. As such, the one-way damping structure 1 can provide one-way damping effect, wherein different friction torques in different directions are generated by the slide of the spring 11 relative to the installation shaft 13 when the spring 11 is rotated in different directions relative to the installation shaft 13.

Figure 7:
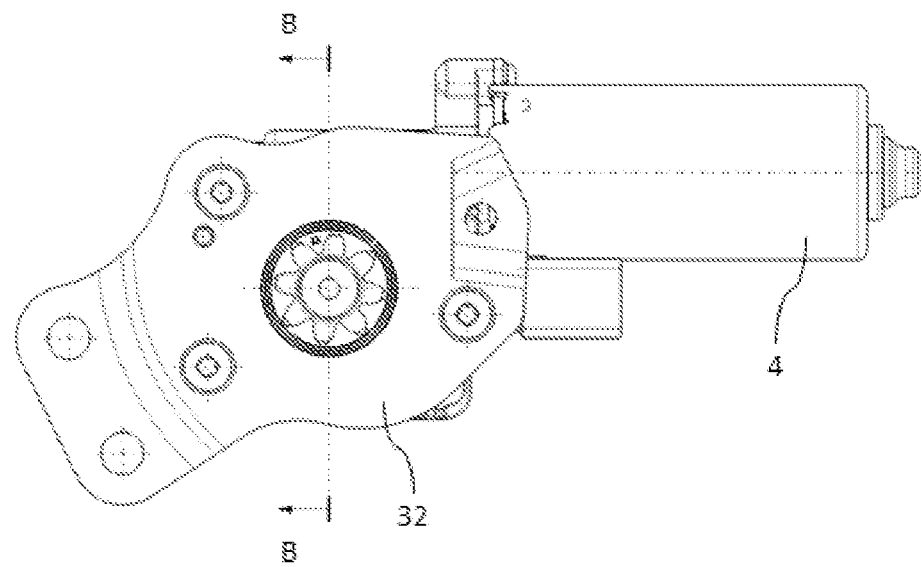
FIG. 7 is a side view of an adjustment assembly including the one-way damping structure of the first preferred embodiment according to the present invention.
Figure 8:
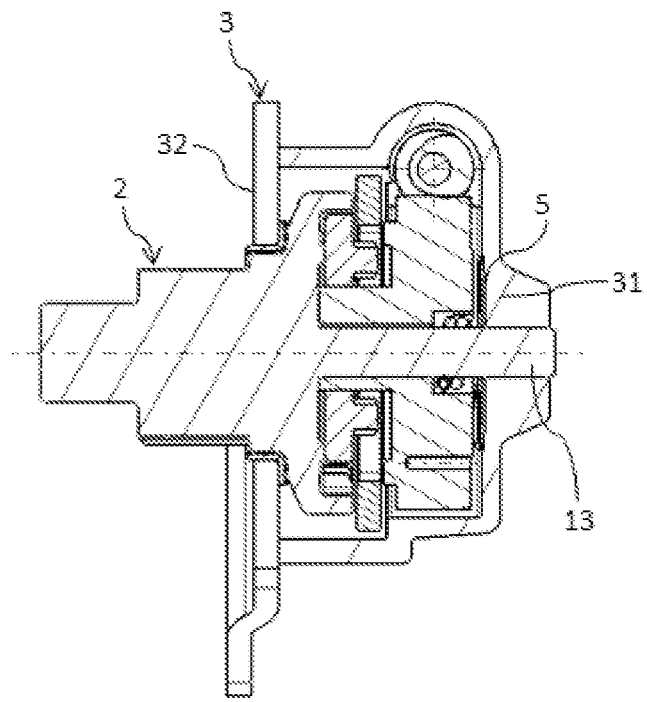
FIG. 8 is a cross-sectional view taken along line B-B of FIG. 7.

As shown in FIGS. 7-8, an adjustment assembly according to the present invention comprises the one-way damping structure 1 of the first preferred embodiment, an output structure 2, an installation structure 3 and a driver 4, wherein the one-way damping structure 1 and the output structure 2 are installed on the installation structure 3, and the driver 4 is connected to the output structure 2 by the one-way damping structure 1. In the present embodiment, the output structure 2 is connected to a height adjustment mechanism for a seat basin, so as to adjust the seat upwards and downwards by the driver 4. Thus, the adjustment assembly forms a seat height adjuster.

The installation structure 3 comprises a gearbox 31 fixedly connected to a cover plate 32, wherein the one-way damping structure 1 and the output structure 2 are generally installed between the gearbox 31 and the cover plate 32.

The driver 4 is a motor, which is connected to a worm 121.

In particular, the adjustment assembly further comprises a gasket 5 around on the installation shaft 13 and disposed between the spring 11 and the gearbox 31. In the present embodiment, the gasket 5 is a corrugated gasket. It should be understood that the gasket 5 can be a similar elastic gasket, which is used to adjust the axial gap between the spring 11 and the gearbox 31 along the installation shaft 13 on one hand, and to prevent the spring 11 from axially moving off the installation shaft 13 on the other hand. The gasket 5 can also be a flat gasket or a gasket with other structural shapes or even be omitted, when there is another fixing device for the spring 11 along the axial direction of the installation shaft 13 and there is another structure for adjusting the axial gap between the spring 11 and the gearbox 31.

As such, during the adjustment process of the seat height adjuster according to the present embodiment, the worm 121 is driven to be rotated by the driver 4, and the motion and power are transmitted to the helical gear 122, so that the helical gear 122 is rotated around the installation shaft 13. Since the fixing portion 111 of the spring 11 is fixedly connected to the helical gear 122 and the annular portion 113 is around on the installation shaft 13 in an interference fit manner, resistance is provided by the rotation of the annular portion 113 of the spring 11 relative to the installation shaft 13 when the helical gear 122 is rotated relative to the installation shaft 13. Once the resistance provided by the spring 11 is overcome by the helical gear 122, the motion and power are transmitted to the output structure 2, thereby to adjust the seat upwards and downwards.

Figure 9:
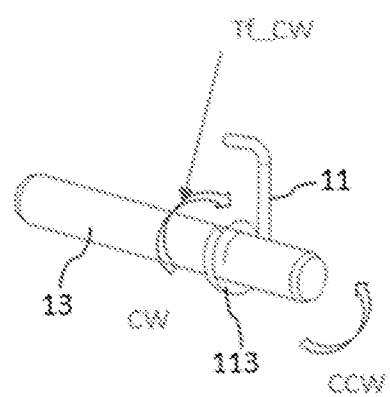
FIG. 9 is a first mating state diagram of the installation shaft and the spring of FIG. 7.

As shown in FIG. 9, when the seat is adjusted downwards, the helical gear 122 drives the annular portion 113 of the spring 11 to rotate in the CCW direction relative to the installation shaft 13, and a set frictional resistance torque Tf_CW in the CW direction is generated between the spring 11 and the installation shaft 13. The frictional resistance torque Tf_CW drives the meshing tooth surface of the helical gear 122 in close contact with the meshing tooth surface of the worm 121, so that the entire seat is adjusted downwards steadily and slowly.

Figure 10:
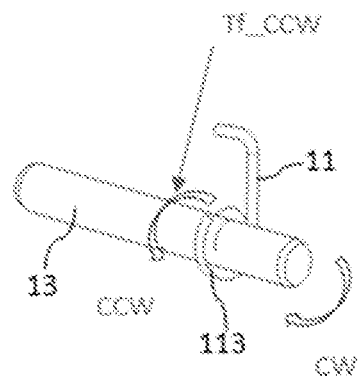
FIG. 10 is a second mating state diagram of the installation shaft and the spring of FIG. 7.
Figure 11:
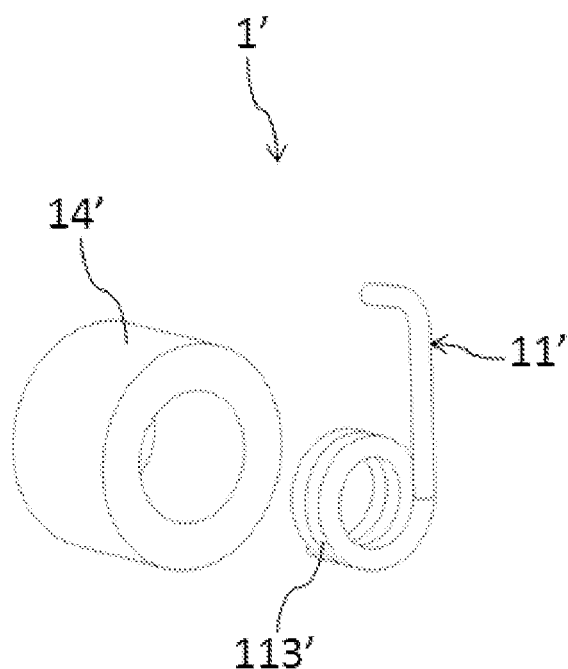
FIG. 11 is an exploded view of an annular bushing and a spring of a one-way damping structure according to the second preferred embodiment of the present invention.
Figure 12:
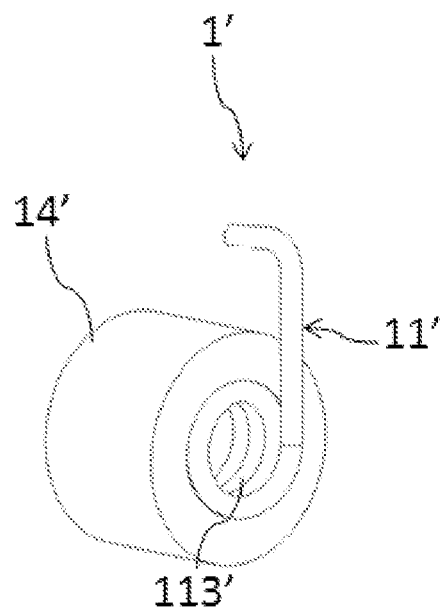
FIG. 12 is an assembly schematic diagram of the annular bushing and spring of FIG. 11.
Figure 13:
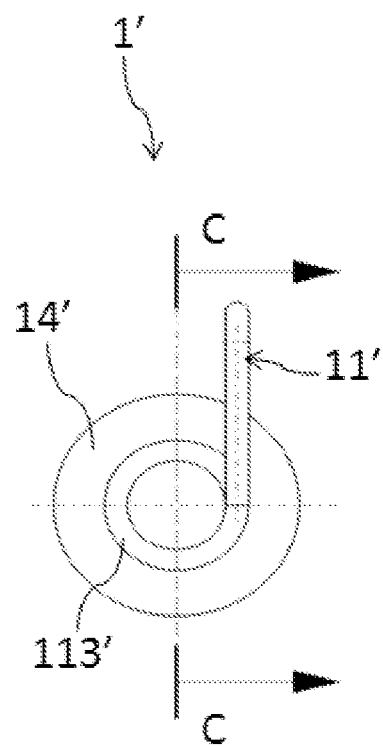
FIG. 13 is a side view of FIG. 12.
Figure 14:
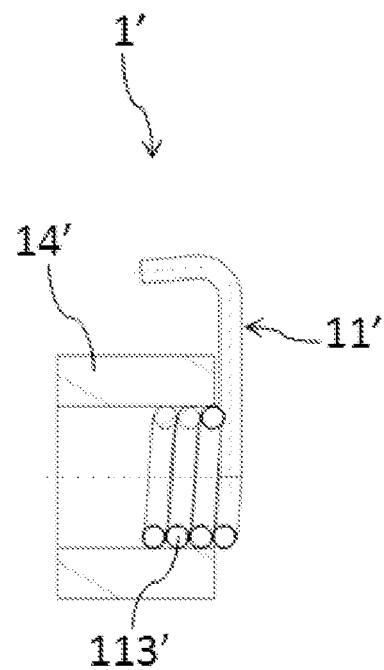
FIG. 14 is a cross-sectional view taken along line C-C of FIG. 13.

As shown in FIG. 10, when the seat is adjusted upwards, the helical gear 122 drives the annular portion 113 of the spring 11 to rotate in the CW direction relative to the installation shaft 13, and a relatively small frictional resistance torque Tf_CCW in the CCW direction is generated between the spring 11 and the installation shaft 13. Compared with the frictional resistance torque Tf_CW, the frictional resistance torque Tf_CCW is very small and negligible. Thus, no effect is caused in the seat lifting direction, and the seat lifting ability and the seat lifting speed are essentially unaffected.

As such, according to the above two processes, for the one-way damping structure 1 of the seat height adjuster according to the present embodiment, on one hand, the internal resistance of the system is increased when the seat is adjusted downwards so that the entire downward adjustment is smooth, and on the other hand, the internal resistance is negligible when the seat is adjusted upwards so that the lifting ability of the seat is unaffected. In a word, the seat height adjuster according to the present embodiment utilizes one-way damping properties in which the spring 11 of the one-way damping structure 1 generates different torques in different rotation directions. In combination with the traditional output structure 2 and the installation structure 3, the driver 4 continues to stably defy a fixed load so as to work when the seat is adjusted downwards under the load, and the lifting ability is unaffected when the seat is adjusted upwards. Specifically, when the seat is adjusted downwards under the load, the driver 4 continues to work stably, and the internal resistance of the entire system is stable, the problem of abnormal noise and unstable operation caused by the unstable or too small internal resistance internal resistance is overcome. Only the downward adjustment is affected by the one-way damping structure 1, and the upward adjustment of the seat and the lifting ability are unaffected. Since the damping is increased during the downward adjustment of the seat, the downward adjustment is slowed down, and the difference between the speeds of the upward and downward adjustments becomes smaller.

In the first embodiment, the annular portion 113 of the spring 11 of the one-way damping structure 1 is around on the installation shaft 13 in an interference fit manner, such that the friction torque is generated by the slide of the internal wall defining the opening of the annular portion 113 of the spring 11 relative to the outer surface of the installation shaft 13. Differently, the one-way damping structure 1' according to the second preferred embodiment of the present invention further comprises an annular bushing 14', the friction torque is generated by the slide of the outer diameter surface of the annular portion 113' of the spring 11' relative to the internal wall defining the opening of the annular bushing 14', as shown in FIGS. 11-14. In particular, the outer diameter surface of the annular portion 113' of the spring 11' and the internal wall defining the opening of the annular bushing 14' are in an interference fit manner.

Figure 15:
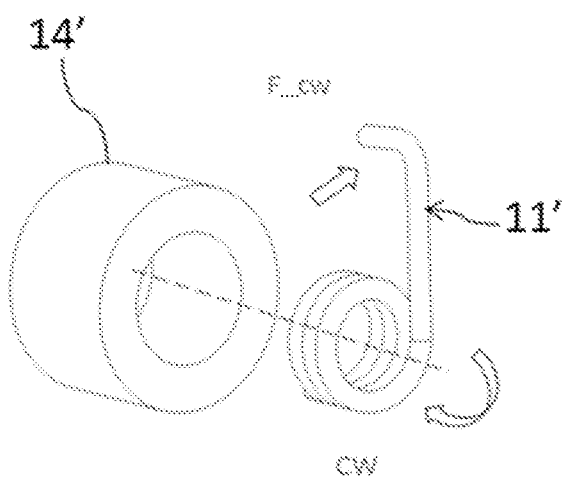
FIG. 15 is a first mating state diagram of the annular bushing and the spring of FIG. 11.

As shown in FIG. 15, when the spring 11' is rotated in the CW direction relative to the annular bushing 14' under the driving force F_cw, a rated friction torque in the CCW direction is generated by the slide of the outer diameter surface of the annular portion 113' of the spring 11' relative to the internal wall defining the opening of the annular bushing 14'. The rated friction torque can be designed and controlled as needed.

Figure 16:
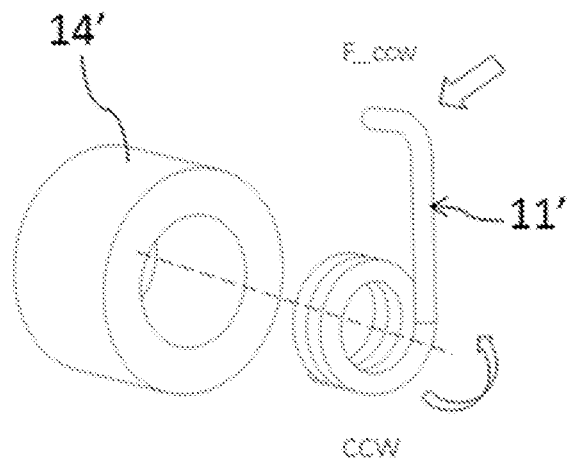
FIG. 16 is a second mating state diagram of the annular bushing and the spring of FIG. 11.

As shown in FIG. 16, when the spring 11' is rotated in the CCW direction relative to the annular bushing 14' under the driving force F_ccw, a relatively small friction torque is generated due to the outer diameter surface of the annular portion 113' of the spring 11' gradually disengaging from the internal wall defining the opening of the annular bushing 14'.

As such, the one-way damping effect is provided, wherein different friction torques in different directions are generated when the spring 11' is rotated in different directions under the external force. The damping direction can be switched by adjusting the helical direction (right-handed to left-handed) of the spring 11'.

In the first embodiment, the fixing portion 111 of the spring 11 of the one-way damping structure 1 is fixedly connected to the helical gear 122, and the annular portion 113 of the spring 11 is around on the installation shaft 13 in an interference fit manner, such that the friction torque is generated by the slide of the annular portion 113 relative to the installation shaft 13. Differently, the one-way damping structure 1" according to the third preferred embodiment of the present invention further comprises a protruding structure 15", wherein one end of the spring 11" is fixed to the protruding structure 15", and the other end is cooperated with the helical gear 122, as shown in FIGS. 17-21.

Figure 17:
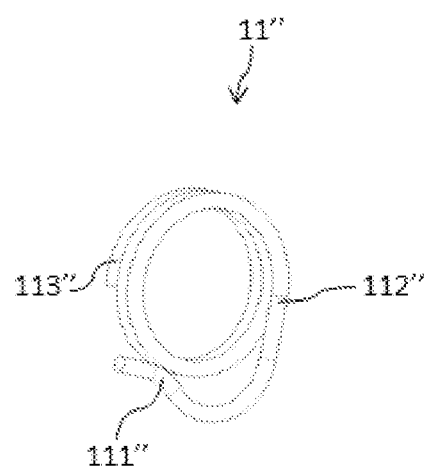
FIG. 17 is a structural schematic diagram of a spring of a one-way damping structure according to a third preferred embodiment of the present invention.

As shown in FIG. 17, the shape of the spring 11" is slightly different from the spring 11 of the first embodiment, but still comprises a fixing portion 111", a connecting portion 112" and an annular portion 113", wherein the connecting portion 112" is located between the fixing portion 111" and the annular portion 113" and connects the fixing portion 111" to the annular portion 113". In particular, the annular portion 113" comprises at least half a turn spirally extending in a circumferential direction and defining a spring opening.

Figure 18:
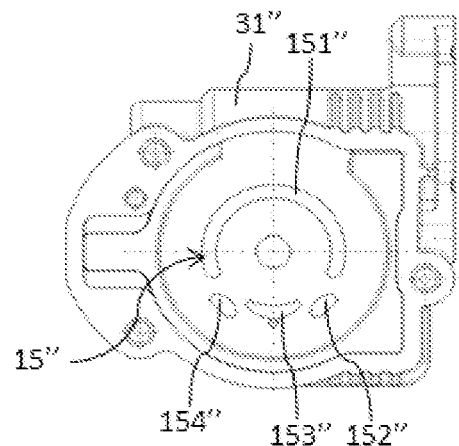
FIG. 18 is a structural schematic diagram of a fixing structure of the one-way damping structure according to the third preferred embodiment of the present invention.
Figure 19:
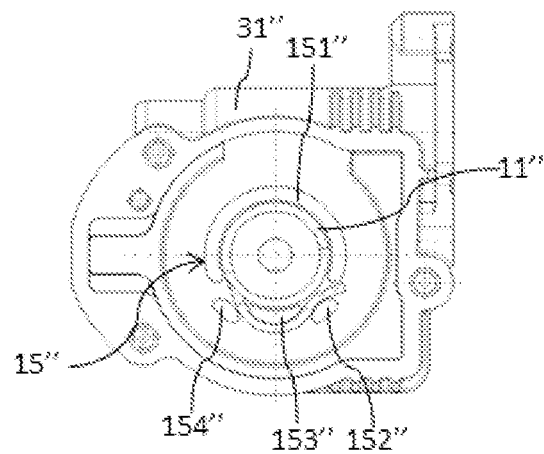
FIG. 19 is an assembly schematic diagram of the spring of FIG. 17 and the fixing structure of FIG. 18.

As shown in FIG. 18, the protruding structure 15" comprises the protuberances 151", 152", 153", 154" on the gearbox 31", and the fixing portion 111" and the connecting portion 112" of the spring 11" are fixed by the space groove enclosed by the protuberances 151", 152", 153", 154", as shown in FIG. 19.

Figure 20:
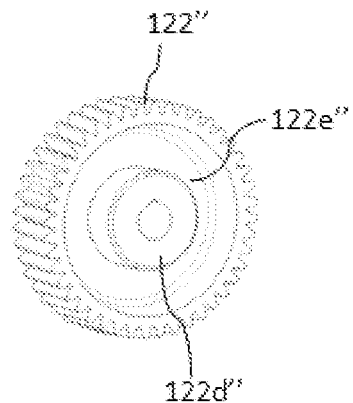
FIG. 20 is a structural schematic diagram of a helical gear of the one-way damping structure according to the third preferred embodiment of the present invention.
Figure 21:
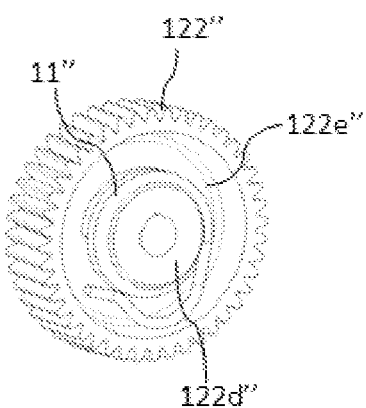
FIG. 21 is an assembly schematic diagram of the spring of FIG. 17 and the helical gear of FIG. 20.

As shown in FIG. 20, unlike the helical gear 122 of the first embodiment, which has a fixing hole 122a, a connecting groove 122b and a receiving hole 122c, the helical gear 122" of the present embodiment comprises a protruding annulus 122d". A receiving groove 122e" is defined by the annulus 122d" and the peripheral edge of the helical gear 122". The annular portion 113" of the spring 11" is around on the annulus 122d" in an interference fit manner and is received in the receiving groove 122e", as shown in FIG. 21. As such, the friction torque is generated by the slide of the annular portion 113" of the spring 11" relative to the annulus 122d".

Figure 22:
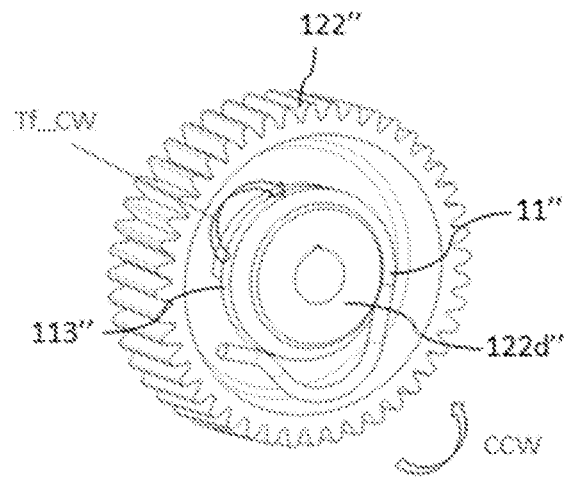
FIG. 22 is a first mating state diagram of the spring of FIG. 17 and the helical gear of FIG. 20.

As shown in FIG. 22, when the seat is adjusted downwards, the annulus 122d" (i.e., the helical gear 122") is rotated in the CCW direction relative to the annular portion 113" of the spring 11", and a set frictional resistance torque Tf_CW in the CW direction is generated between the spring 11" and the annulus 122d". The frictional resistance torque Tf_CW drives the meshing tooth surface of the helical gear 122" in close contact with the meshing tooth surface of the worm, so that the entire seat is adjusted downwards steadily and slowly.

Figure 23:
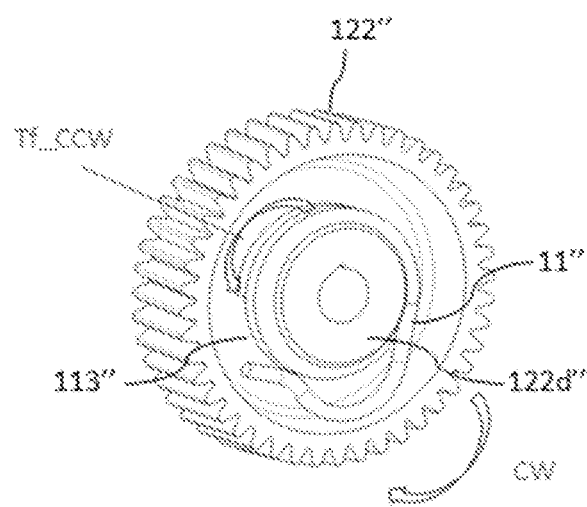
FIG. 23 is a second mating state diagram of the spring of FIG. 17 and the helical gear of FIG. 20.

As shown in FIG. 23, when the seat is adjusted upwards, the annulus 122d" (i.e., the helical gear 122") is rotated in the CW direction relative to the annular portion 113" of the spring 11", and a relatively small frictional resistance torque Tf_CCW in the CCW direction is generated between the spring 11" and the annulus 122d". Compared with the frictional resistance torque Tf_CW, the frictional resistance torque Tf_CCW is very small and negligible. Thus, no effect is caused in the seat lifting direction, and the seat lifting ability and the seat lifting speed are essentially unaffected.

As such, according to the above two processes, for the one-way damping structure 1" of the seat height adjuster according to the present embodiment, on one hand, the internal resistance of the system is increased when the seat is adjusted downwards so that the entire downward adjustment is smooth, and on the other hand, the internal resistance is negligible when the seat is adjusted upwards so that the lifting ability of the seat is unaffected.

In the first embodiment, the annular portion 113 of the spring 11 of the one-way damping structure 1 is around on the installation shaft 13 in an interference fit manner, such that the friction torque is generated by the slide of the annular portion 113 relative to the installation shaft 13. Differently, the one-way damping structure 1''' according to the fourth preferred embodiment of the present invention further comprises a bearing structure 16''', which is cooperated with the annular portion 113''' of the spring 11''', as shown in FIGS. 24-30.

Figure 24:
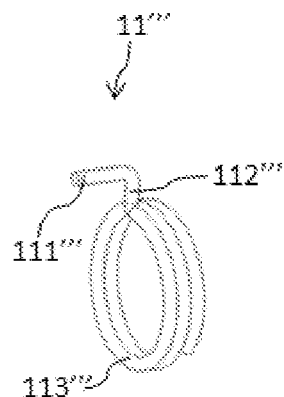
FIG. 24 is a structural schematic diagram of a spring of a one-way damping structure according to a fourth preferred embodiment of the present invention.

As shown in FIG. 24, the shape of the spring 11''' is slightly different from the spring 11 of the first embodiment, but still comprises a fixing portion 111''', a connecting portion 112''' and an annular portion 113''', wherein the connecting portion 112''' is located between the fixing portion 111''' and the annular portion 113''' and connects the fixing portion 111''' to the annular portion 113'''. In particular, the annular portion 113''' comprises at least half a turn spirally extending in a circumferential direction and defining a spring opening.

Figure 25:
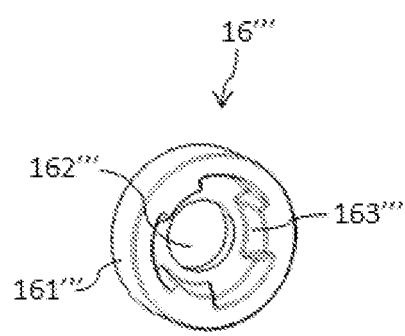
FIG. 25 is a structural schematic diagram of a bearing structure of the one-way damping structure according to the fourth preferred embodiment of the present invention.
Figure 26:
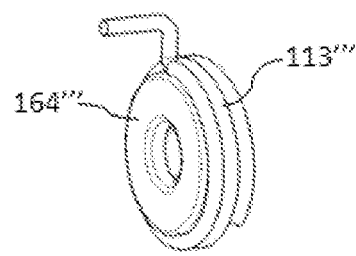
FIG. 26 is an assembly schematic diagram of the spring of FIG. 24 and the bearing structure of FIG. 25.

As shown in FIG. 25, the bearing structure 16''' has an outer peripheral wall 161''', and the annular portion 113''' of the spring 11''' is around on the outer peripheral wall 161''' in an interference fit manner, as shown in FIG. 26. A through hole 162''' is disposed in the middle of the bearing structure 16''' for the installation shaft to pass through, and a plurality of anti-torsion structures 163''' are disposed around the through hole 162'''. In addition, a sliding surface 164''' is formed by the end face of the bearing structure 16''' which is opposite to the anti-torsion structures 163''', as shown in FIG. 26.

Figure 27:
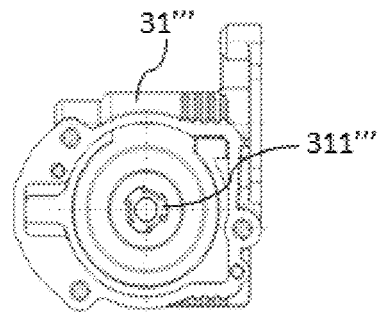
FIG. 27 is a structural schematic diagram of a gearbox with the one-way damping structure according to the fourth preferred embodiment of the present invention.
Figure 28:
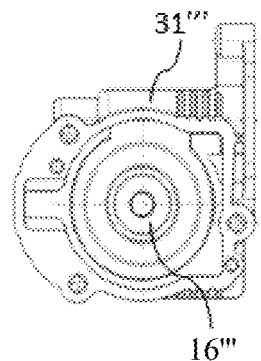
FIG. 28 is an assembly schematic diagram of the bearing structure of FIG. 25 and the gearbox of FIG. 27.

As shown in FIG. 27, the gearbox 31''' has an anti-torsion structure 311''' which is cooperated with the anti-torsion structures 163''' of the bearing structure 16''', as shown in FIG. 28. It should be understood that such anti-torsion structure is disposed to provide that the bearing structure 16''' can be successfully pressed into the gearbox 31''' and can be fixed in position without relative rotation, which can be replaced with other anti-torsion features to provide the similar function as required. The bearing structure 16''' can be integrally formed on the gearbox 31'''.

Figure 29:
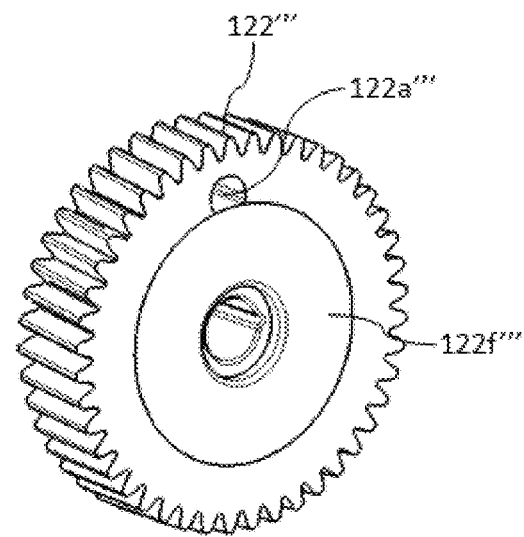
FIG. 29 is a structural schematic diagram of a helical gear of the one-way damping structure according to the fourth preferred embodiment of the present invention.

As shown in FIG. 29, unlike the helical gear 122 of the first embodiment, which has a connecting groove 122b and a receiving hole 122c, the helical gear 122''' of the present embodiment only comprises the fixing hole 122a''', and the fixing portion 111''' of the spring 11''' is inserted into the fixing hole 122a'''. A sliding surface 122f''' is formed by the end face facing the spring 11'''. It should be understood that the structure for fixing the fixing portion 111''' of the spring 11''' is not necessarily a fixing hole, it may be a groove or other features for the fixing portion 111''', as long as one end of the spring 11''' can be fixed on the helical gear 122'''.

Figure 30:
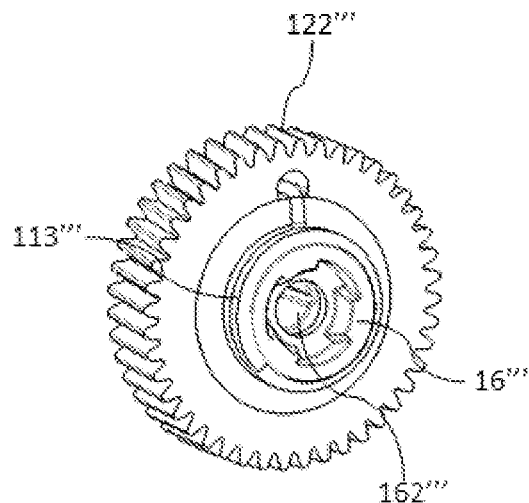
FIG. 30 is an assembly schematic diagram of the bearing structure of FIG. 25 and the helical gear of FIG. 29.

As shown in FIG. 30, in the assembled state, the annular portion 113''' of the spring 11''' is around on the outer peripheral wall 161''' of the bearing structure 16''' in an interference fit manner, such that the friction torque is generated by the slide of the annular portion 113''' of the spring 11''' relative to the bearing structure 16'''. The installation shaft is inserted into the through hole 162''' of the bearing structure 16'''. The sliding surface 122f''' of the helical gear 122''' is matched with the sliding surface 164''' of the bearing structure 16''' to support the installation shaft.

Figure 31:
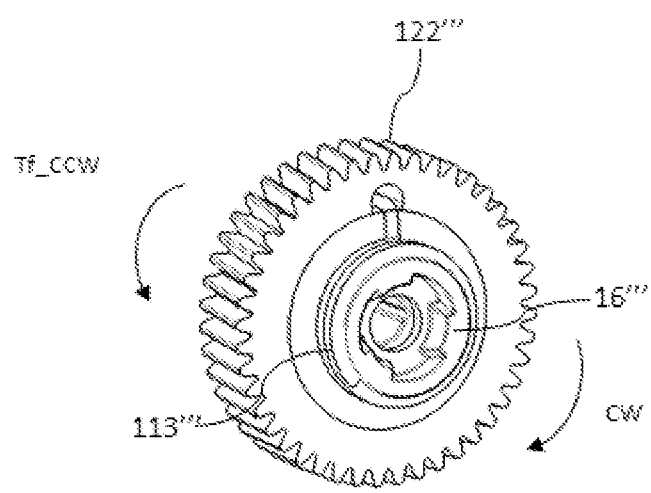
FIG. 31 is a first mating state diagram of the bearing structure of FIG. 25 and the helical gear of FIG. 29.

As shown in FIG. 31, when the seat is adjusted downwards, the bearing structure 16''' is rotated in the CW direction relative to the annular portion 113''' of the spring 11''', and a frictional resistance torque Tf_CCW in the CCW direction is generated between the annular portion 113''' and the bearing structure 16'''. The frictional resistance torque Tf_CCW drives the meshing tooth surface of the helical gear 122''' in close contact with the meshing tooth surface of the worm, so that the entire seat is adjusted downwards steadily and slowly.

Figure 32:
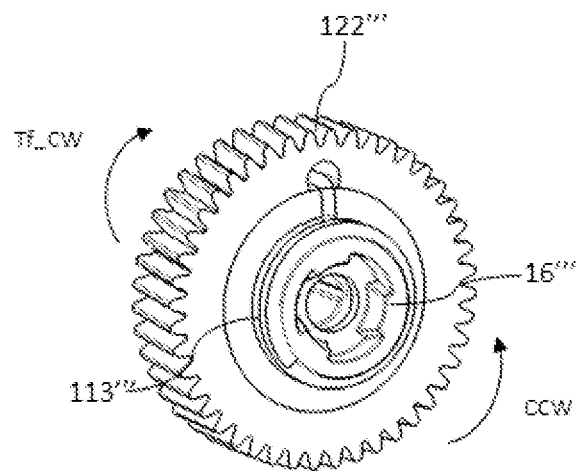
FIG. 32 is a second mating state diagram of the bearing structure of FIG. 25 and the helical gear of FIG. 29.

As shown in FIG. 32, when the seat is adjusted upwards, the bearing structure 16''' is rotated in the CCW direction relative to the annular portion 113''' of the spring 11''', and a frictional resistance torque Tf_CW in the CW direction is generated between the annular portion 113''' and the bearing structure 16'''. Compared with the frictional resistance torque Tf_CCW, the frictional resistance torque Tf_CW is very small and negligible. Thus, no effect is caused in the seat lifting direction, and the seat lifting ability and the seat lifting speed are essentially unaffected.

As such, according to the above two processes, for the one-way damping structure 1''' of the seat height adjuster according to the present embodiment, on one hand, the internal resistance of the system is increased when the seat is adjusted downwards so that the entire downward adjustment is smooth, and on the other hand, the internal resistance is negligible when the seat is adjusted upwards so that the lifting ability of the seat is unaffected.

In the first embodiment, the fixing portion 111 of the spring 11 of the one-way damping structure 1 is fixedly to the helical gear 122, and the annular portion 113 of the spring 11 is around on the installation shaft 13 in an interference fit manner, such that the friction torque is generated by the slide of the annular portion 113 relative to the installation shaft 13. Differently, the one-way damping structure 1"" according to the fifth preferred embodiment of the present invention further comprises a bushing structure 17"", which is cooperated with one end of the spring 11"", as shown in FIGS. 33-38.

Figure 33:
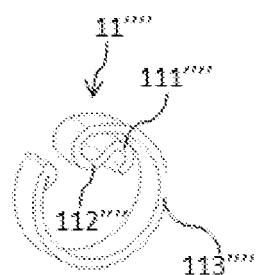
FIG. 33 is a structural schematic diagram of a spring of a one-way damping structure according to a fifth preferred embodiment of the present invention.

As shown in FIG. 33, the shape of the spring 11"" is slightly different from the spring 11 of the first embodiment, but still comprises a fixing portion 111"", a connecting portion 112"" and an annular portion 113"", wherein the connecting portion 112"" is located between the fixing portion 111"" and the annular portion 113"" and connects the fixing portion 111"" to the annular portion 113"". In particular, the annular portion 113"" comprises at least half a turn spirally extending in a circumferential direction and defining a spring opening.

Figure 34:
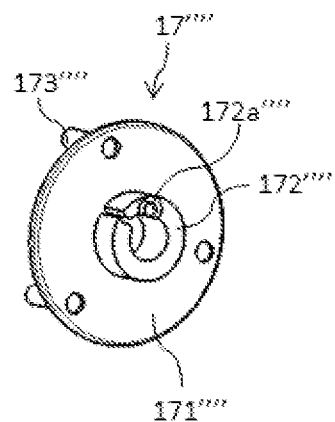
FIG. 34 is a first structural schematic diagram of a bushing structure of the one-way damping structure according to the fifth preferred embodiment of the present invention.
Figure 35:
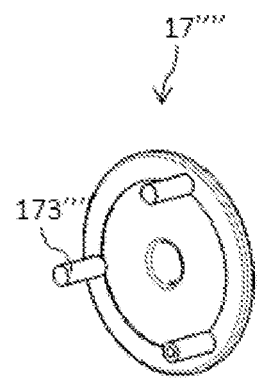
FIG. 35 is a second structural schematic diagram of the bushing structure of the one-way damping structure according to the fifth preferred embodiment of the present invention.

As shown in FIG. 34, the bushing structure 17"" has a clamping structure 172"" and pins 173"" oppositely protruding from a body 171"". In particular, the clamping structure 172''' has a fixing bump 172a'''', and the pins 173''' are three fixing feet evenly distributed, as shown in FIG. 35.

Figure 36:
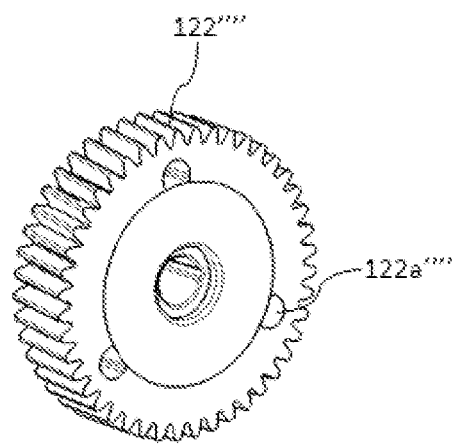
FIG. 36 is a structural schematic diagram of a helical gear of the one-way damping structure according to the fifth preferred embodiment of the present invention.
Figure 37:
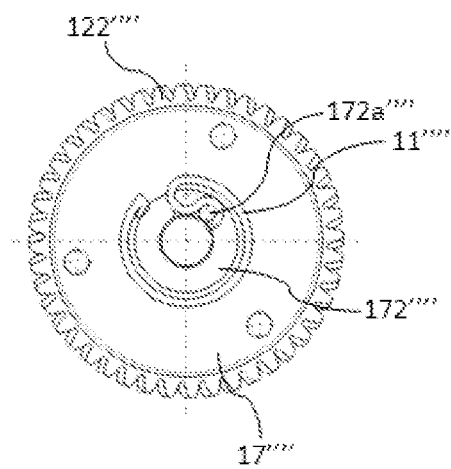
FIG. 37 is an assembly schematic diagram of the spring of FIG. 33, the bushing structure of FIG. 34 and the helical gear of FIG. 36.

As shown in FIG. 36, unlike the helical gear 122 of the first embodiment, which has a connecting groove 122b and a receiving hole 122c, the helical gear 122"" of the present embodiment only comprises the fixing hole 122a'''', and the pins 173"" of the bushing structure 17"" are inserted into the fixing hole 122a''''. It should be understood that the structure for fixing the pins 173"" of the bushing structure 17"" is not necessarily a fixing hole, it may be a groove or other features for the pins 173'''', as long as the bushing structure 17"" can be fixed on the helical gear 122"". Once the bushing structure 17"" is fixed to the helical gear 122"" in an anti-torsion manner, the spring 11"" is fixed to the bushing structure 17"" in virtue of the clamping structure 172"". In particular, the fixing portion 111"" is clamped and fixed by the fixing bump 172a'''', as shown in FIG. 37.

Figure 38:
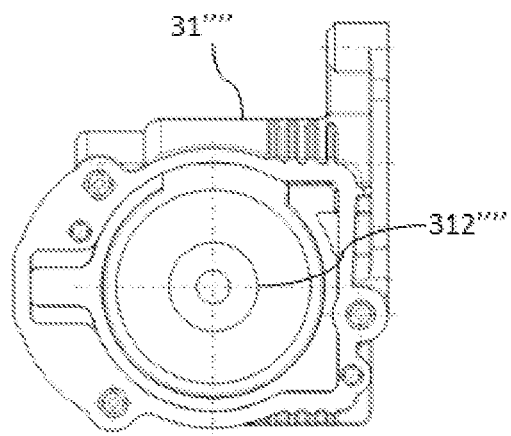
FIG. 38 is a structural schematic diagram of a gearbox with the one-way damping structure according to the fifth preferred embodiment of the present invention.
Figure 39:
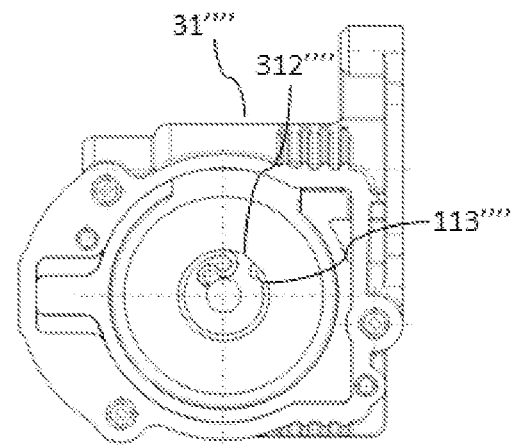
FIG. 39 is an assembly schematic diagram of the spring of FIG. 33 and the gearbox of FIG. 38.

As shown in FIG. 38, the gearbox 31"" has a gearbox slot 312"", and the spring 11"" is tightly installed on the inner cylindrical surface of the gearbox slot 312"". That is to say, the spring 11"" has a radially outwardly expanding pre-tightened force, such that the friction torque is generated by the slide of the outer diameter surface of the annular portion 113"" of the spring 11"" relative to the inner cylindrical surface of the gearbox groove 312"", as shown in FIG. 39.

Figure 40:
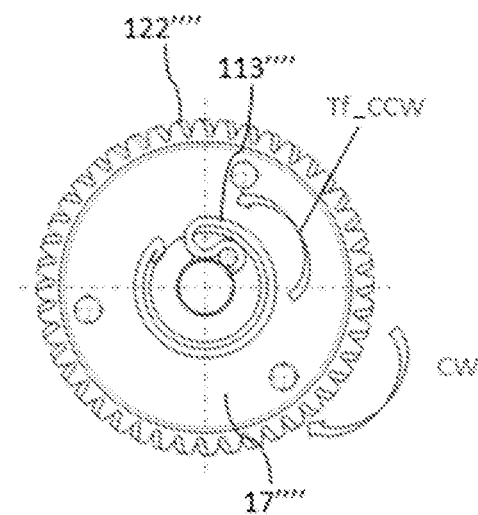
FIG. 40 is a first mating state diagram of the spring of FIG. 33 and the bushing structure of FIG. 34.

As shown in FIG. 40, when the seat is adjusted downwards, the helical gear 122"" drives the annular portion 113"" of the spring 11"" to rotate in the CW direction relative to the gearbox 31"" by the bushing structure 17"", and a frictional resistance torque Tf_CCW in the CCW direction is generated between the outer diameter surface of the annular portion 113"" of the spring 11"" and the inner cylindrical surface of the gearbox groove 312"". The frictional resistance torque Tf_CCW drives the meshing tooth surface of the helical gear 122"" in close contact with the meshing tooth surface of the worm, so that the entire seat is adjusted downwards steadily and slowly.

Figure 41:
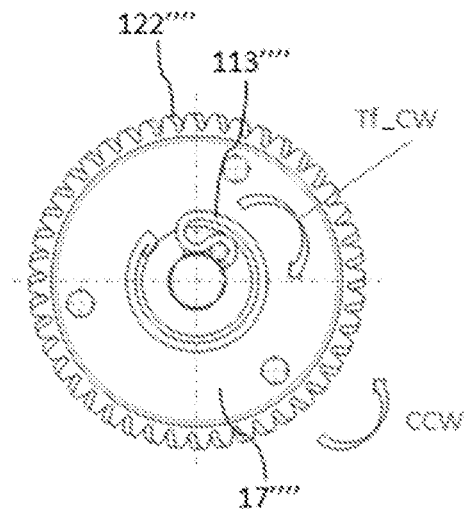
FIG. 41 is a second mating state diagram of the spring of FIG. 33 and the bushing structure of FIG. 34.

As shown in FIG. 41, when the seat is adjusted upwards, the helical gear 122"" drives the annular portion 113"" of the spring 11"" to rotate in the CCW direction relative to the gearbox 31"" by the bushing structure 17"", and a frictional resistance torque Tf_CW in the CW direction is generated between the outer diameter surface of the annular portion 113"" of the spring 11"" and the inner cylindrical surface of the gearbox groove 312"". Compared with the frictional resistance torque Tf_CCW, the frictional resistance torque Tf_CW is very small and negligible. Thus, no effect is caused in the seat lifting direction, and the seat lifting ability and the seat lifting speed are essentially unaffected.

As such, according to the above two processes, for the one-way damping structure 1"" of the seat height adjuster according to the present embodiment, on one hand, the internal resistance of the system is increased when the seat is adjusted downwards so that the entire downward adjustment is smooth, and on the other hand, the internal resistance is negligible when the seat is adjusted upwards so that the lifting ability of the seat is unaffected.

Figure 42:
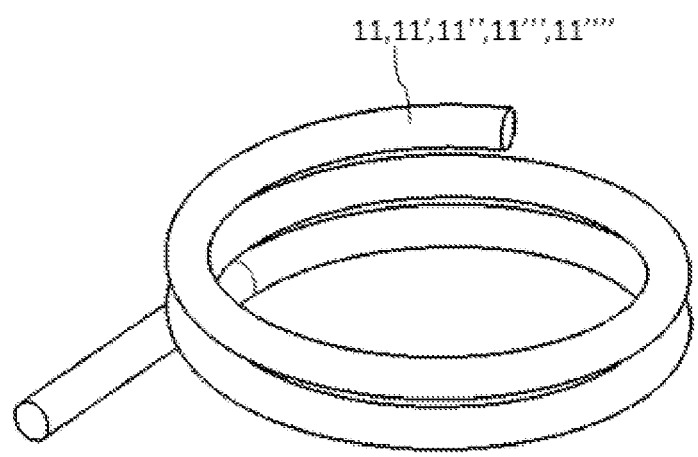
FIG. 42 is a schematic diagram of a first wire of the spring according to the present invention.
Figure 43:
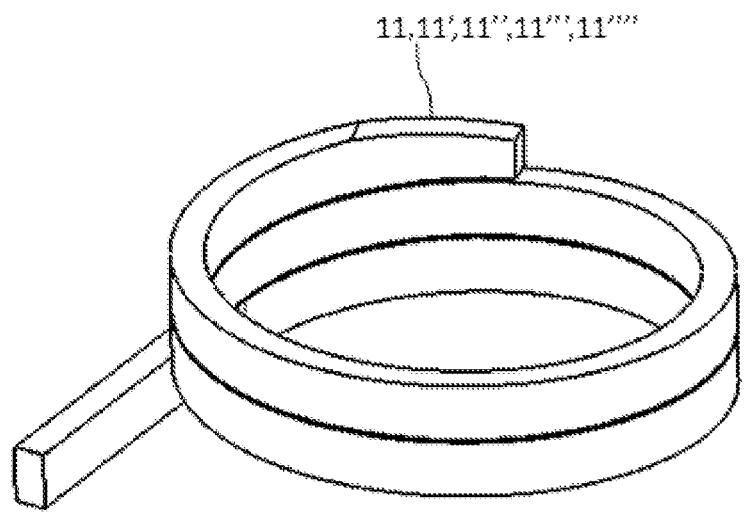
FIG. 43 is a schematic diagram of a second wire of the spring according to the present invention.

It should be understood that the wire for the springs 11, 11', 11''', 11"" according to the present invention can be in the circular cross-section shown in FIG. 42, or in the rectangular cross-section shown in FIG. 43, or in other special-shaped cross-section. The fixing way for the springs 11, 11', 11''', 11"" is not limited to above embodiments, as long as at least one end is fixed. The friction torque is generated by the slide of the springs 11, 11', 11''', 11"" relative to the paired shaft. On the contacting surfaces, the positive pressure can be guaranteed by the interference fit during assembly, or can be generated by other methods, such as the spring connecting to other adjustment mechanisms. When the friction resistance is required, the spring can be adjusted manually or automatically such that the spring can be tightened to generate a positive pressure between the spring and the shaft, in order to generate the friction resistance. When the friction resistance is not required, the spring can be adjusted manually or automatically such that the spring can be loosed to release the positive pressure between the spring and the shaft, and then the frictional resistance disappears. It should be understood that by controlling this adjustment method, the positive pressure between the spring and the shaft can be adjusted, and thus the damping structure with variable resistances can be provided, that is, a one-way variable damping mechanism. The direction of one-way damping structure can be switched by adjusting the helical direction of the springs 11, 11', 11''', 11"". The friction torque of the springs 11, 11', 11''', 11" can be adjusted by the number of turns of the spring, or by the spring materials, or by the magnitude of interference between the spring and the shaft or the internal wall defining the opening.

It should be understood that the one-way damping structure 1, 1', 1''', 1"" according to the present invention comprises the most basic damping generating unit: a spring, a friction shaft or an internal wall defining a friction hole, wherein the friction shaft may be a shaft, or an annular boss or a sleeve, as long as providing the outer cylindrical surface for matching with the spring. Also, the outer cylindrical surface can be continuous or discontinuous. The internal wall defining the friction hole can be the internal wall defining the opening, or the annular groove surface, as long as providing the inner cylindrical surface for matching with the spring. Also, the inner cylindrical surface can be continuous or discontinuous. For the one-way damping structure 1, 1', 1''', 1"", the matching units, such as the drive unit, the spring fixing unit, etc. can be changed in different fields. The fixing way for the spring and the drive element or the fixing element is not limited to above mentioned methods, as long as the structural features provide the corresponding function, which should be included in the protection scope of the invention. For the one-way damping structure 1, 1', 1''', 1'''', the damping force can be generated by a dynamic friction resistance. Similarly, static friction resistance can also be used in transmission units or other mechanisms. For example, a static friction force is generated when there is a tendency of the slide of the spring relative to the friction shaft or the internal wall defining the friction hole, and a certain friction force is generated in a single direction. The one-way damping structure 1, 1', 1''', 1'''' can be applied to application fields such as load protection. Such damping structure unit 1, 1', 1''', 1'''' can be formed as a one-way locking mechanism to form one-way load protection in one-way torque testing and other fields through the specific torque design according to the one-way damping characteristics. The one-way damping structure 1, 1', 1''', 1'''' can be made into the form of damping bearings in other engineering fields. It should be understood that a two-way identical damping mechanism, a two-way different damping mechanism, one-way locking and one-way damping mechanism, two-way locking mechanism, one-way variable damping mechanism, and two-way variable damping mechanism, etc. can be formed from the one-way damping structure 1, 1', 1''', 1'''' through the specific torque design and the combination of the same or different types of base units of the one-way damping mechanism.

It should be understood that the one-way damping structure 1, 1', 1''', 1'''' according to the present invention is not limited to be applied to seat height adjustment products, but can also be applied to other similar adjustment mechanisms, such as seat backrest adjustment unit, etc. The one-way damping structure 1, 1', 1''', 1'''' can be used not only in electric adjustment products, but also in manual adjustment products. The one-way damping structure 1, 1', 1''', 1'''' is not limited to seat transmission products, but also for the production of measuring tools, and other products in other fields. The one-way damping structure 1, 1', 1''', 1'''' is not limited to be acted on the helical gear, but also be fixed on other structural ends with relative motion, such as the motor shaft or the end of the output gear shaft. For example, for the seat height adjustment product, the one-way damping structure can be applied to the matching between the motor rotating shaft and the spring, and also can be applied to the output gear shaft of the seat to achieve a similar or better product effect.

Figure 44:
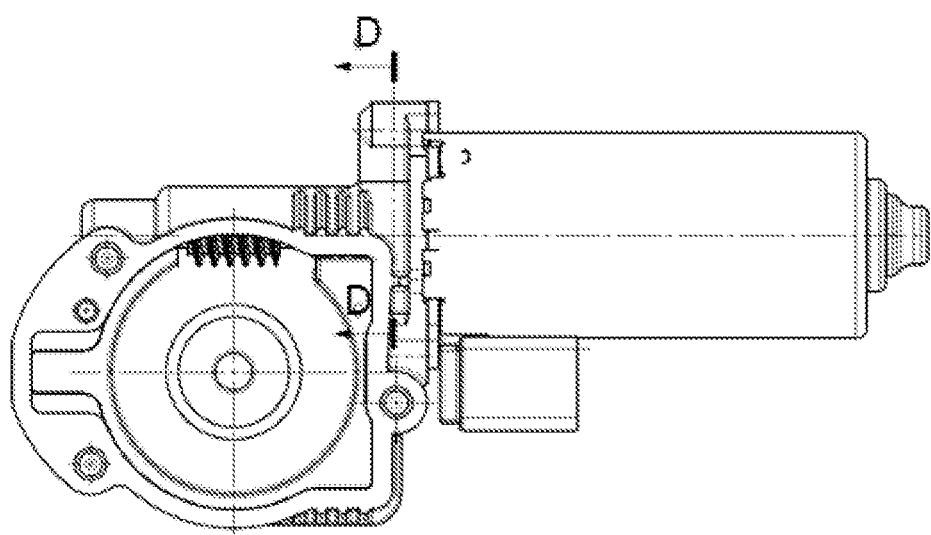
FIG. 44 is a side view of an adjustment assembly including a one-way damping structure according to yet another preferred embodiment of the present invention.
Figure 45:
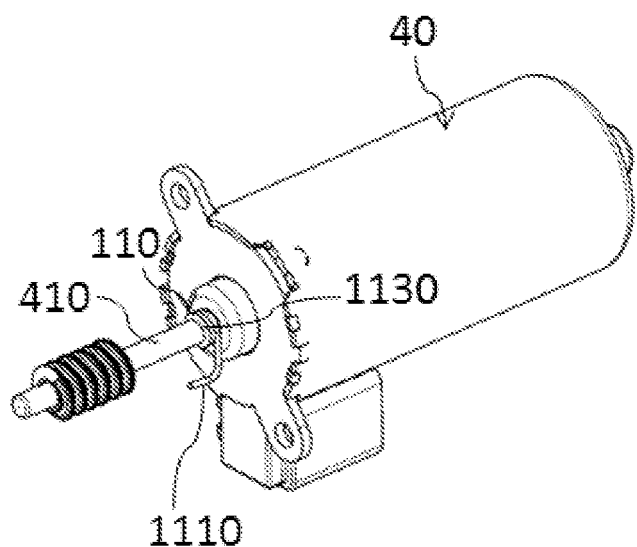
FIG. 45 is a structural schematic diagram of the one-way damping structure of FIG. 44.
Figure 46:
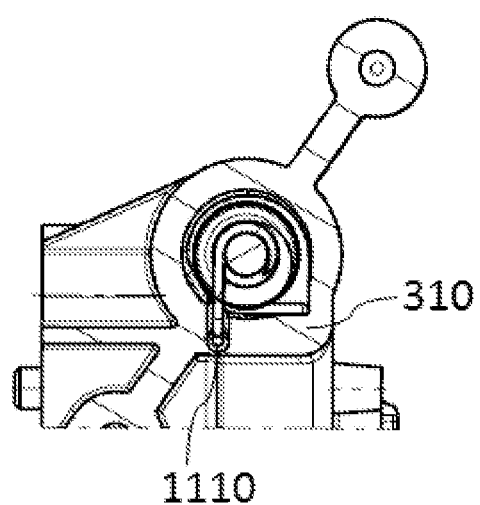
FIG. 46 is a cross-sectional view taken along line D-D of FIG. 44 showing a fixing groove on a gearbox for fixing the spring.

As shown in FIGS. 44-46, the annular portion 1130 of the spring 110 of the one-way damping structure of the adjustment assembly according to yet another embodiment of the present invention is around on the motor shaft 410 of the driver 40, and the fixing portion 1110 of the spring 110 is fixed to the fixing groove of the gearbox 310. When the motor shaft 410 is rotated, a one-way friction force is generated between the internal wall defining the opening of the annular portion 1130 and the outer surface of the motor shaft 410, in order to provide the one-way damping characteristic. It should be understood that the direction of the friction force can be adjusted according to the helical direction and installation direction of the spring.

The foregoing description refers to preferred embodiments of the present invention, and is not intended to limit the scope of the present invention. Various changes can be made to the foregoing embodiments of the present invention. That is to say, all simple and equivalent changes and modifications made in accordance with the claims of the present invention and the content of the description fall into the protection scope of the patent of the present invention. What is not described in detail in the present invention is conventional technical content.

What is claimed is:

1. A one-way damping structure, comprising a spring, a drive element and a friction force generation member, wherein the spring and the drive element are connected such that the spring is driven by means of the drive element, wherein the spring comprises a fixing portion, a connecting portion and an annular portion, wherein the connecting portion is located between the fixing portion and the annular portion and connects the fixing portion to the annular portion, wherein the fixing portion is fixed, wherein the annular portion comprises at least half a turn spirally extending in a circumferential direction and defining a spring opening, and wherein the annular portion slides relative to the friction force generation member so as to generate a friction torque, wherein the one-way damping structure further comprises a bushing structure connected to the drive element in an anti-torsion manner, wherein the fixing portion is clamped by the bushing structure, wherein the annular portion is tightly installed in a fixing groove, an inner cylindrical surface of which is formed as the friction force generation member, and wherein the friction torque is generated by the slide of an outer diameter surface of the annular portion relative to the inner cylindrical surface of the fixing groove.

2. The one-way damping structure of claim 1, wherein the one-way damping structure comprises an installation shaft, which is formed as the friction force generation member, and wherein the annular portion is around on the installation shaft in an interference fit manner such that the friction torque is generated by the slide of an internal wall defining the opening of the annular portion relative to an outer surface of the installation shaft.

3. The one-way damping structure of claim 2, wherein a fixing hole or fixing groove is disposed on an end face of the drive element adjacent to the spring, wherein the fixing portion of the spring is received in the fixing hole or fixing groove.

4. The one-way damping structure of claim 1, wherein the one-way damping structure further comprises an annular bushing, which is formed as the friction force generation member and having an internal wall defining an opening, and wherein the friction torque is generated by the slide of an outer diameter surface of the annular portion relative to the internal wall defining the opening of the annular bushing.

5. The one-way damping structure of claim 4, wherein the outer diameter surface of the annular portion and the internal wall defining the opening of the annular bushing are in an interference fit manner.

6. The one-way damping structure of claim 1, wherein the one-way damping structure further comprises a protruding structure independent of the drive element, wherein the fixing portion is fixed to the protruding structure, wherein the drive element comprises a protruding annulus, which is formed as the friction force generation member, and wherein the annular portion is around on the annulus and the friction torque is generated by the slide of the annular portion relative to the annulus.

7. The one-way damping structure of claim 6, wherein the protruding structure comprises at least one protuberance, and wherein the fixing portion is fixed by a space groove enclosed by the protuberance.

8. The one-way damping structure of claim 6, wherein a receiving groove is defined by the annulus and a peripheral edge of the drive element, and wherein the annular portion is received in the receiving groove and is around on the annulus in an interference fit manner.

9. The one-way damping structure of claim 1, wherein the one-way damping structure further comprises a bearing structure independent of the drive element, which is formed as the friction force generation member, and wherein the annular portion is around on the bearing structure in an interference fit manner such that the friction torque is generated by the slide of the annular portion relative to the bearing structure.

10. The one-way damping structure of claim 9, wherein the one-way damping structure comprises an installation shaft, wherein the drive element is around on the installation shaft, and wherein a surface of the bearing structure facing the drive element is matched with a surface of the drive element facing the bearing structure so as to support the installation shaft.

11. The one-way damping structure of claim 1, wherein the bushing structure comprises a clamping structure and pins oppositely protruding from a body, wherein the bushing structure is connected to the drive element in virtue of the pins, and wherein the fixing portion is clamped in virtue of the clamping structure.

12. The one-way damping structure of claim 11, wherein the clamping structure comprises a fixing bump for clamping the fixing portion.

13. An adjustment assembly comprising a one-way damping structure, comprising a spring, a drive element and a friction force generation member, wherein the spring and the drive element are connected such that the spring is driven by means of the drive element, wherein the spring comprises a fixing portion, a connecting portion and an annular portion, wherein the connecting portion is located between the fixing portion and the annular portion and connects the fixing portion to the annular portion, wherein the fixing portion is fixed, wherein the annular portion comprises at least half a turn spirally extending in a circumferential direction and defining a spring opening, wherein the annular portion slides relative to the friction force generation member so as to generate a friction torque, and wherein the adjusting assembly further comprises an installation structure and a driver, wherein the one-way damping structure is installed on the installation structure, wherein the driver has a motor shaft, wherein the annular portion of the spring is around on the motor shaft in an interference fit manner such that the friction torque is generated by the slide of an internal wall defining the opening of the annular portion relative to an outer surface of the motor shaft.

14. The adjustment assembly of claim 13, wherein the adjustment assembly further comprises an output structure, an installation structure and a driver, wherein the one-way damping structure and the output structure are installed on the installation structure, and wherein the driver is connected to the output structure by the one-way damping structure.

15. The adjustment assembly of claim 14, wherein the output structure is connected to a height adjustment mechanism for a seat basin, and wherein the adjustment assembly forms a seat height adjuster.

16. The adjustment assembly of claim 14, wherein the installation structure comprises a gearbox fixedly connected to a cover plate, wherein the one-way damping structure and the output structure are installed between the gearbox and the cover plate.

17. The adjustment assembly of claim 16, wherein the adjustment assembly further comprises a gasket disposed between the spring and the gearbox.

18. The adjustment assembly of claim 13, wherein the installation structure comprises a gearbox fixedly connected to a cover plate, wherein the one-way damping structure is installed between the gearbox and the cover plate, wherein the gearbox has a fixing groove, and wherein the fixing portion of the spring is fixed to the fixing groove.

* * * * *